(12) United States Patent
Atoche

(10) Patent No.: US 9,561,778 B2
(45) Date of Patent: Feb. 7, 2017

(54) METHOD OF SELECTING AND STOPPING A VEHICLE USING VEHICLE-TO-VEHICLE COMMUNICATION

(71) Applicant: Robert Bosch GmbH, Stuttgart (DE)

(72) Inventor: Carlos Atoche, West Bloomfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/796,036

(22) Filed: Jul. 10, 2015

(65) Prior Publication Data
US 2017/0008486 A1 Jan. 12, 2017

(51) Int. Cl.
*B60R 25/08* (2006.01)
*G05D 1/00* (2006.01)
*B60R 25/01* (2013.01)

(52) U.S. Cl.
CPC ............ *B60R 25/08* (2013.01); *B60R 25/01* (2013.01); *G05D 1/0011* (2013.01)

(58) Field of Classification Search
USPC ..... 340/302, 903, 904, 423.11; 701/93, 101, 701/121, 45, 517, 70
See application file for complete search history.

(56) References Cited

U.S. PATENT DOCUMENTS

| | | | | |
|---|---|---|---|---|
| 5,293,527 A | * | 3/1994 | Sutton ................ | F41H 13/0093 180/167 |
| 5,503,059 A | * | 4/1996 | Pacholok ............. | B60R 25/04 180/167 |
| 6,163,277 A | * | 12/2000 | Gehlot ................. | G08G 1/052 340/539.1 |
| 6,411,887 B1 | * | 6/2002 | Martens ............... | G08G 1/205 180/167 |
| 6,505,101 B1 | * | 1/2003 | Brill .................... | B60R 25/042 340/425.5 |
| 6,707,392 B1 | * | 3/2004 | Melton ................. | G07C 5/008 340/902 |
| 6,892,119 B2 | | 5/2005 | Sakai et al. | |

(Continued)

FOREIGN PATENT DOCUMENTS

| | | |
|---|---|---|
| GB | 2462254 A | 2/2010 |
| WO | 98/30421 | 7/1998 |

OTHER PUBLICATIONS

European Patent Office Extended Search Report for Application No. 16173628.5 dated Aug. 30, 2016 (17 pages).

*Primary Examiner* — Thomas Tarcza
*Assistant Examiner* — Richard Goldman
(74) *Attorney, Agent, or Firm* — Michael Best & Friedrich LLP

(57) ABSTRACT

Method of selecting and stopping a vehicle using vehicle-to-vehicle communication includes selecting and suppressing a local vehicle including vehicle-to-vehicle communication comprising transmitting a vehicle-to-vehicle locating signal from a host vehicle to local vehicles to obtain a location and a direction of movement for local vehicles within a local area, selecting a local vehicle as a selected vehicle to be suppressed, and suppressing the selected vehicle using vehicle-to-vehicle communication from the host vehicle to the selected vehicle. The suppressing of the selected vehicle by the host vehicle includes providing a warning to the operator of the selected vehicle, limiting speed, along with decelerating and halting of the selected vehicle.

19 Claims, 5 Drawing Sheets

(56) References Cited

U.S. PATENT DOCUMENTS

| | | | |
|---|---|---|---|
| 6,897,762 B2* | 5/2005 | Howells | B60R 25/04 340/12.5 |
| 6,958,707 B1* | 10/2005 | Siegel | G08G 1/087 340/435 |
| 7,015,792 B2* | 3/2006 | Lessard | B60R 25/04 340/426.11 |
| 7,305,294 B2* | 12/2007 | Bate | B60R 25/04 303/122.04 |
| 9,151,633 B2* | 10/2015 | Hoffberg | G01C 21/36 |
| 2002/0175830 A1* | 11/2002 | Hudson | E01F 9/662 340/907 |
| 2003/0112141 A1* | 6/2003 | Arunkumar | B60R 25/102 340/539.18 |
| 2003/0128104 A1* | 7/2003 | Lessard | B60R 25/04 340/426.11 |
| 2004/0061600 A1 | 4/2004 | Wehner et al. | |
| 2005/0195069 A1* | 9/2005 | Dunand | B60R 25/043 340/5.61 |
| 2005/0261806 A1* | 11/2005 | Canie | G08C 23/04 701/2 |
| 2006/0022809 A1* | 2/2006 | Lessard | B60R 25/04 340/426.1 |
| 2006/0227008 A1* | 10/2006 | Bryant | G08G 1/0965 340/902 |
| 2008/0040023 A1* | 2/2008 | Breed | B60N 2/2863 701/117 |
| 2008/0221750 A1* | 9/2008 | Baraty | G07C 5/008 701/31.4 |
| 2008/0243350 A1* | 10/2008 | Harkness | B60Q 9/00 701/93 |
| 2009/0231158 A1* | 9/2009 | Grigsby | G08G 1/0962 340/902 |
| 2011/0093180 A1* | 4/2011 | Hougo | B60R 25/04 701/101 |
| 2012/0166021 A1* | 6/2012 | Sawyer | B60R 25/04 701/2 |
| 2013/0044008 A1* | 2/2013 | Gafford | G08G 1/205 340/989 |
| 2013/0086164 A1 | 4/2013 | Wheeler et al. | |
| 2013/0184933 A1* | 7/2013 | Smith | G06F 17/00 701/36 |
| 2013/0191132 A1 | 7/2013 | Tanaka | |
| 2014/0229061 A1* | 8/2014 | Tarnutzer | B60R 25/04 701/36 |
| 2014/0365160 A1* | 12/2014 | Steffen, II | B61L 27/0055 702/122 |
| 2014/0374182 A1* | 12/2014 | Williams | B60R 25/045 180/167 |
| 2015/0166009 A1* | 6/2015 | Outwater | B60R 25/04 701/2 |
| 2015/0168173 A1* | 6/2015 | Lewis-Evans | G06Q 10/0833 701/454 |
| 2016/0071418 A1* | 3/2016 | Oshida | G08G 1/22 701/23 |
| 2016/0165424 A1* | 6/2016 | El-Dinary | H04B 1/3822 455/404.2 |

\* cited by examiner

METHOD OF SELECTING AND STOPPING A VEHICLE USING VEHICLE-TO-VEHICLE COMMUNICATION

BACKGROUND OF THE INVENTION

Embodiments of the invention relate to methods and systems of selecting and halting a vehicle using vehicle-to-vehicle communication.

Police car chases in response to crime have a history of resulting in vehicle accidents, such that some municipalities have decided to not pursue vehicles, except in limited circumstances. In order to avoid police car chases, arrangements to enable remote controlled disabling of vehicles have been contemplated. One object of the invention is to provide a way for ensuring accuracy in the selection and control of a local vehicle.

BRIEF SUMMARY OF THE INVENTION

In one embodiment, the invention provides a method for selecting and suppressing a local vehicle using vehicle-to-vehicle communication. The method includes transmitting a vehicle-to-vehicle locating signal from a host vehicle to local vehicles to obtain a location and a direction of movement for local vehicles within a local area, selecting a local vehicle as a selected vehicle to be suppressed, and suppressing the selected vehicle using vehicle-to-vehicle communication from the host vehicle to the selected vehicle.

In another embodiment, obtaining the location and the direction of movement of local vehicles within a local area includes the host vehicle selection and suppression system receiving vehicle-to-vehicle location reply signals from replying local vehicles within a local area, and the vehicle-to-vehicle location reply signals each including a vehicle identifier for identifying a local vehicle and a location positioning signal for the location and the direction of movement for a local vehicle.

In one embodiment, selecting the selected vehicle to be suppressed includes processing the vehicle identifiers and the location positioning signals of the vehicle-to-vehicle location reply signals from replying local vehicles, displaying replying local vehicles on a visual display on the host vehicle according to the location and the direction of movement, and receiving an input selecting a replying local vehicle as the selected vehicle.

In one embodiment, the visual display includes a graphical user interface provided on the host vehicle and the selection of the selected vehicle occurs by touch of the graphical user interface.

Another embodiment includes confirming that the selected vehicle is an intended local vehicle by transmitting a vehicle-to-vehicle confirmation signal from the host vehicle to the selected vehicle, and the selected vehicle receiving the vehicle-to-vehicle confirmation signal and operating at least one from a group consisting of illuminating external lamps and actuating a vehicle horn unit of the selected vehicle for confirming the identity of the selected vehicle.

In one embodiment, suppressing the selected vehicle includes transmitting a vehicle-to-vehicle warning signal from the host vehicle to the selected vehicle, and outputting at least one from a group consisting of a voice command from a loudspeaker unit and a visual command provided on a display of the selected vehicle in response to the vehicle-to-vehicle warning signal.

In one embodiment, the voice command is a voice signal provided with the vehicle-to-vehicle warning signal transmitted by the host vehicle for output from the loudspeaker unit in the selected vehicle.

In another embodiment, suppressing the selected vehicle includes transmitting a vehicle-to-vehicle disabling signal from the host vehicle to the selected vehicle, and operating an electronic stability program of an electronic stability control unit or an automatic cruise control of the selected vehicle with the vehicle-to-vehicle disabling signal to limit speed of the selected vehicle.

In one embodiment, suppressing the selected vehicle includes transmitting a vehicle-to-vehicle halting signal from the host vehicle to the selected vehicle, and operating an electronic stability program of an electronic stability control unit of the selected vehicle in response to the vehicle-to-vehicle halting signal to reduce vehicle speed of the selected vehicle at a deceleration and to actuate vehicle brakes to halt movement of the selected vehicle In one embodiment, a host vehicle selection and suppression system for a host vehicle to suppress a selected vehicle includes: a host vehicle position locating system disposed in the host vehicle for providing a location of the host vehicle, a host vehicle transceiver for providing vehicle-to-vehicle communication between the host vehicle and local vehicles; a user interface disposed in the host vehicle for providing inputs to the host vehicle selection and suppression system, and a host vehicle suppression control unit disposed in the host vehicle, the host vehicle suppression control unit including a processor. The processor is configured to transmit a vehicle-to-vehicle locating signal from the host vehicle to local vehicles to obtain a location and a direction of movement for local vehicles within a local area, select a local vehicle as the selected vehicle to be suppressed in response to a selection input to the user interface, and suppress operation of the selected vehicle by transmitting a vehicle-to-vehicle suppression signal from the host vehicle suppression control unit to the selected vehicle in response to an output from the user interface.

In one embodiment, the processor of the host vehicle suppression control unit is configured to confirm the selected vehicle by transmitting a vehicle-to-vehicle confirmation signal from the host vehicle to the selected vehicle. The selected vehicle confirms it is the intended local vehicle by providing an external indication.

One embodiment of the invention is a method for identifying and suppressing a selected vehicle including vehicle-to-vehicle communication comprising obtaining a location and a direction of movement for local vehicles within a local area using vehicle-to-vehicle communication from a host vehicle to local vehicles and selecting a local vehicle as the selected vehicle to be suppressed. The method includes confirming that the selected vehicle is an intended local vehicle and suppressing the selected vehicle using vehicle-to-vehicle communication from the host vehicle to the selected vehicle.

In another embodiment, confirming that the selected vehicle is an intended local vehicle includes transmitting a vehicle-to-vehicle confirmation signal from the host vehicle to the selected vehicle, and a selected vehicle suppression system of the selected vehicle receiving the confirmation signal and providing an external indication that the selected vehicle was selected.

In one embodiment, the obtaining of a location and a direction of movement of local vehicles within a local area is performed by transmitting a vehicle-to-vehicle locating signal from the host vehicle to local vehicles to request location and direction of movement for local vehicles within a local area. The obtaining of a location includes receiving vehicle-to-vehicle location reply signals from local vehicles within a local area, the vehicle-to-vehicle location reply signals each including a vehicle identifier for identifying a local vehicle and a location positioning signal for the location and the direction of movement of a local vehicle. The location and direction are determined by processing the vehicle identifiers and the location positioning signals of the vehicle-to-vehicle location reply signals from replying local vehicles. The location and direction of the replying local vehicles are displayed on a visual display according to the location and the direction of movement.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
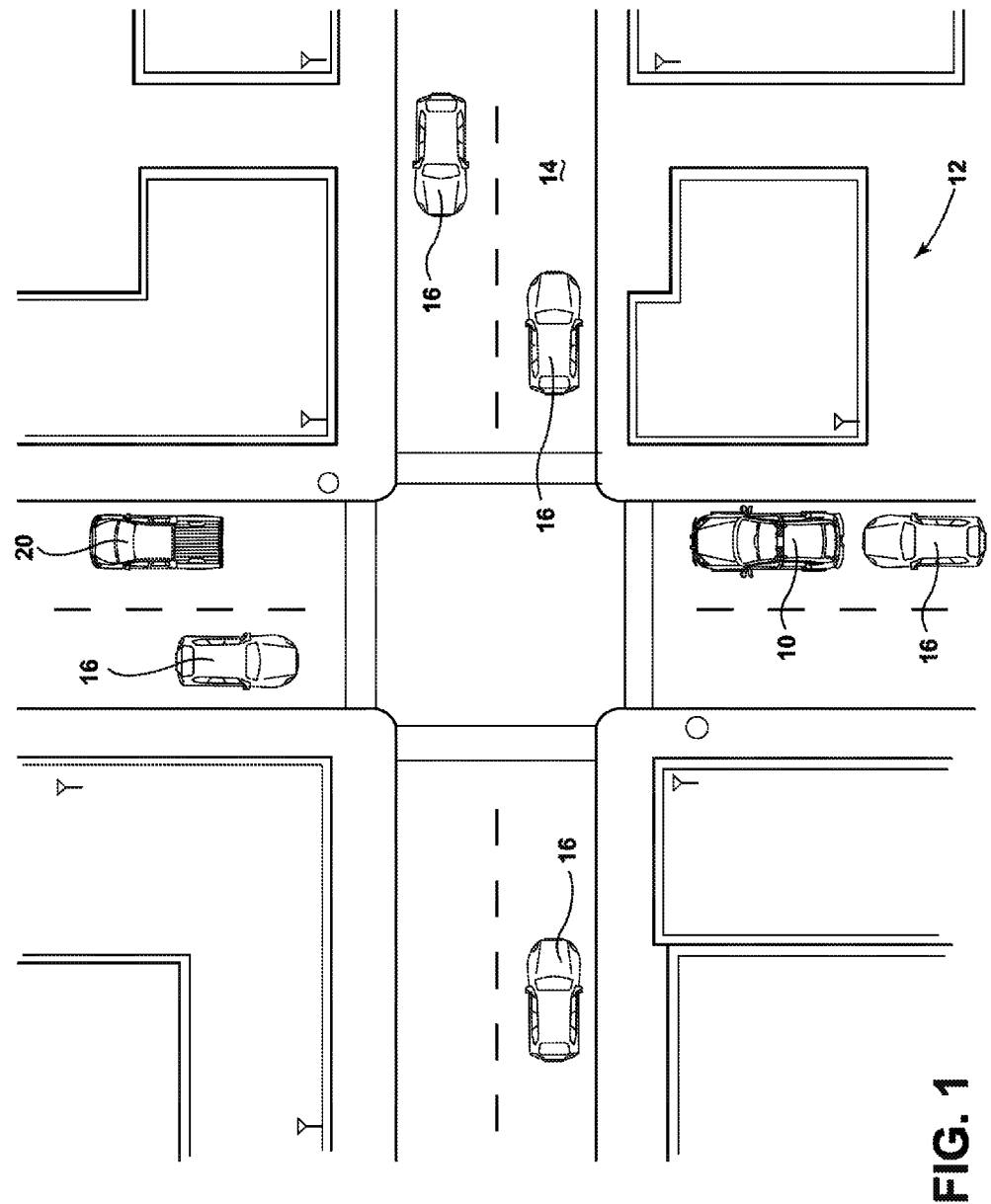
FIG. 1 is an overhead view of a host vehicle and local vehicles within a local area according to one embodiment.

FIG. 1 shows a host vehicle 10 operating within a local area 12 with roadways 14 that include local vehicles 16. One of the local vehicles 16 is selected by the host vehicle 10 and becomes the selected vehicle 20.

Figure 2:
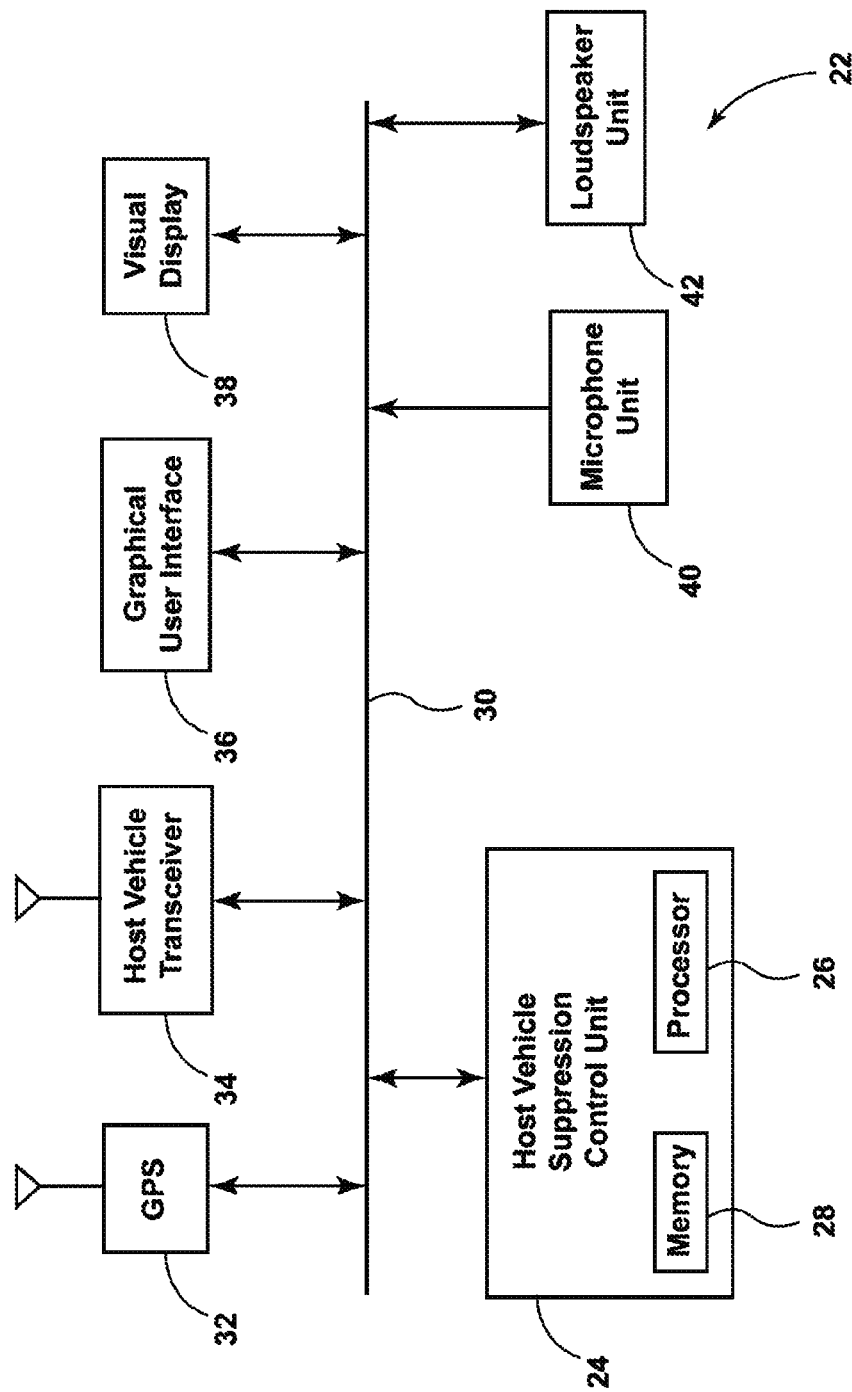
FIG. 2 is a block diagram of a host vehicle selection and suppression system.

FIG. 2 shows a host vehicle selection and suppression system 22 of the host vehicle that is capable of selecting a local vehicle 16 to be controlled as the selected vehicle 20. The host vehicle selection and suppression system 22 includes a host vehicle suppression control unit 24 that includes a processor 26 and a memory 28 for storing executable instructions and algorithms.

The host vehicle suppression control unit 24 shown in FIG. 2 is in communication with a communication bus, for example a controller area network (CAN) bus 30, a FlexRay bus or other bus arrangement. The host vehicle selection and suppression system 22 includes a host vehicle position locating system such as a global positioning system (GPS) 32 connected to the CAN bus 30 for providing signals having a location for the host vehicle 10. While GPS 32 is disclosed, other arrangements providing location positioning signals are contemplated.

The host vehicle selection and suppression system 22 includes a host vehicle transceiver 34 having a transmitter and a receiver. The host vehicle transceiver 34 is connected to the CAN bus 30 for providing two-way communication between the host vehicle suppression control unit 24 and local vehicles 16 including the selected vehicle 20. In one embodiment, the host vehicle transceiver 34 is a radio frequency (RF) transceiver. Infrared, ultrasonic and other types of signal transmission are also contemplated for two-way communication.

FIG. 2 also shows a user interface, for instance a graphical user interface (GUI) 36 for receiving manual inputs from an operator. The graphical user interface 36 is connected to the CAN bus 30 for providing inputs to the host vehicle suppression control unit 24. Further, in some embodiments the graphical user interface 36 includes a display that is a touchscreen. In some embodiments, an optional separate visual display 38 is provided. Further, a microphone unit 40 communicates with the host vehicle suppression control unit 24 via the CAN bus 30. The microphone unit 40 is capable of providing voice or audio communication with an operator in a selected vehicle 20. Finally, a loudspeaker unit 42 connected to the CAN bus 30 includes an amplifier and loudspeakers mounted to the exterior of the host vehicle 10 for projecting sound away from the host vehicle. The loudspeaker unit 42 outputs voice or audio commands provided by an operator located within the host vehicle and using the microphone unit 40.

Figure 3:
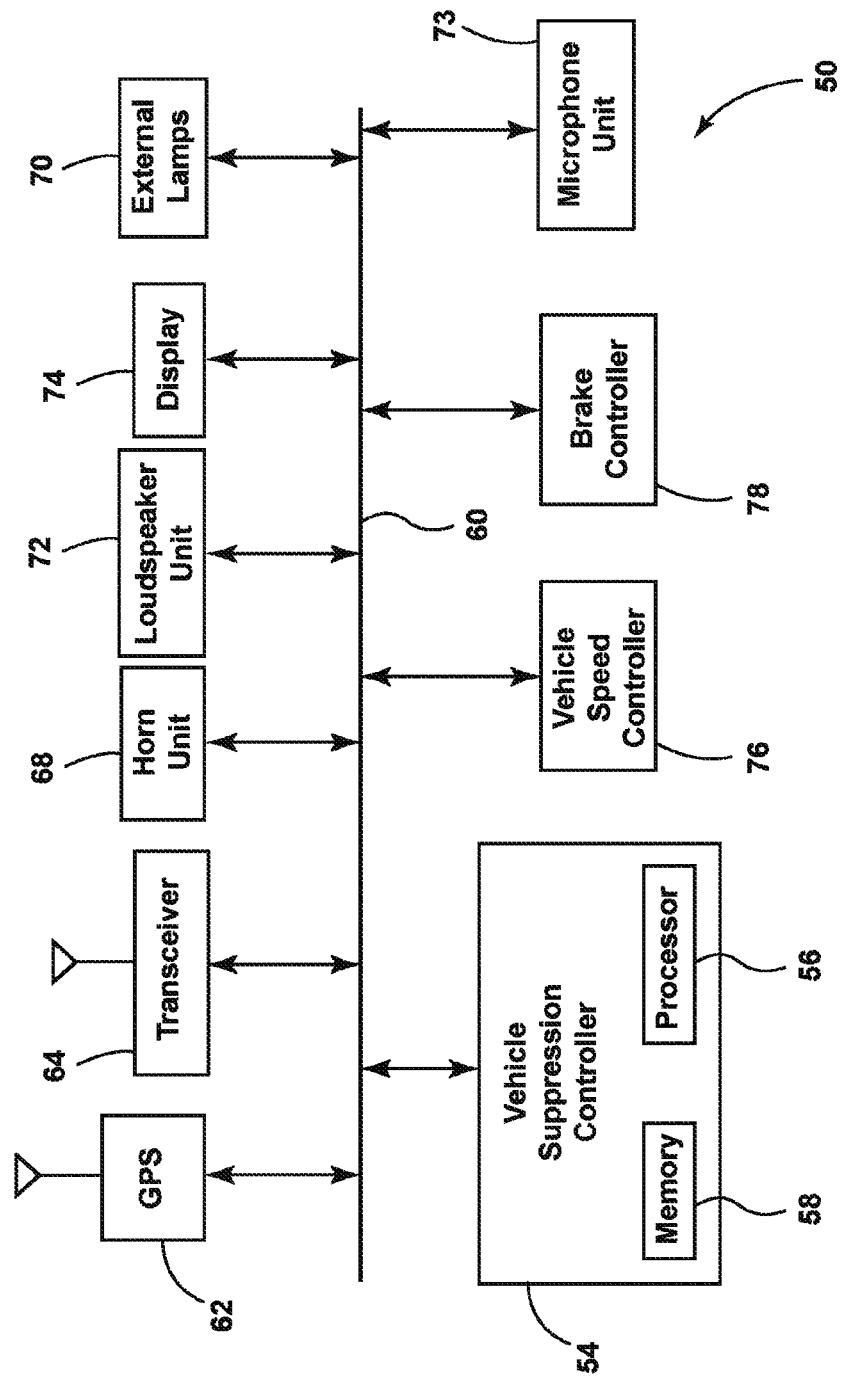
FIG. 3 is a block diagram of a vehicle suppression control system for a local vehicle.

FIG. 3 shows a selected vehicle suppression system 50 that is capable of transmitting a location and vehicle identifier for a local vehicle 16 to the host vehicle 10 and performing suppression operation of the selected vehicle 20. The selected vehicle suppression system 50 includes a vehicle suppression controller 54 that includes a processor 56 and memory 58 for storing executable instructions and algorithms. The selected vehicle suppression system 50 is intended to be provided in all local vehicles 16, except for the host vehicles 10, which typically are emergency services vehicles.

The vehicle suppression controller 54 shown in FIG. 3 is in communication with a communication bus, for example a CAN bus 60 or a FlexRay bus. The selected vehicle suppression system 50 includes a global positioning system 62 connected to the CAN bus 60 for providing positioning signals for the selected vehicle 20 and a transceiver 64 having a transmitter and a receiver. The transceiver 64 is connected to the CAN bus 60 for providing two-way communication between the vehicle suppression controller 54 and the host vehicle 10.

The selected vehicle suppression system 50 shown in FIG. 3 includes a vehicle horn unit 68 that includes an amplifier for providing a drive signal to a horn and external lamps 70 that are also in communication with the vehicle suppression controller 54 via the CAN bus 60. Further, the selected vehicle suppression system 50 includes a loudspeaker unit 72 that includes an amplifier and loudspeakers disposed within an interior vehicle passenger compartment of the selected vehicle 20. The selected vehicle suppression system 50 also includes a microphone unit 73 and a display 74 disposed within an interior of the selected vehicle 20, and preferably on the vehicle console or dashboard. In some embodiments, the display 74 is a graphical user interface that is capable of providing a visual display and receiving inputs to provide to the vehicle suppression controller 54.

FIG. 3 also shows a vehicle speed controller 76 for communication with the vehicle suppression controller 54 via the CAN bus 60. The vehicle speed controller 76 represents one or all of a vehicle power train controller, an electronic stability program controller, and a cruise control, along with any combination thereof. Further, FIG. 3 shows a brake controller 78 in communication with the CAN bus 60. The brake controller 78 may include a part of the electronic stability program controller, along with any necessary components for braking the selected vehicle 20.

Figure 4:
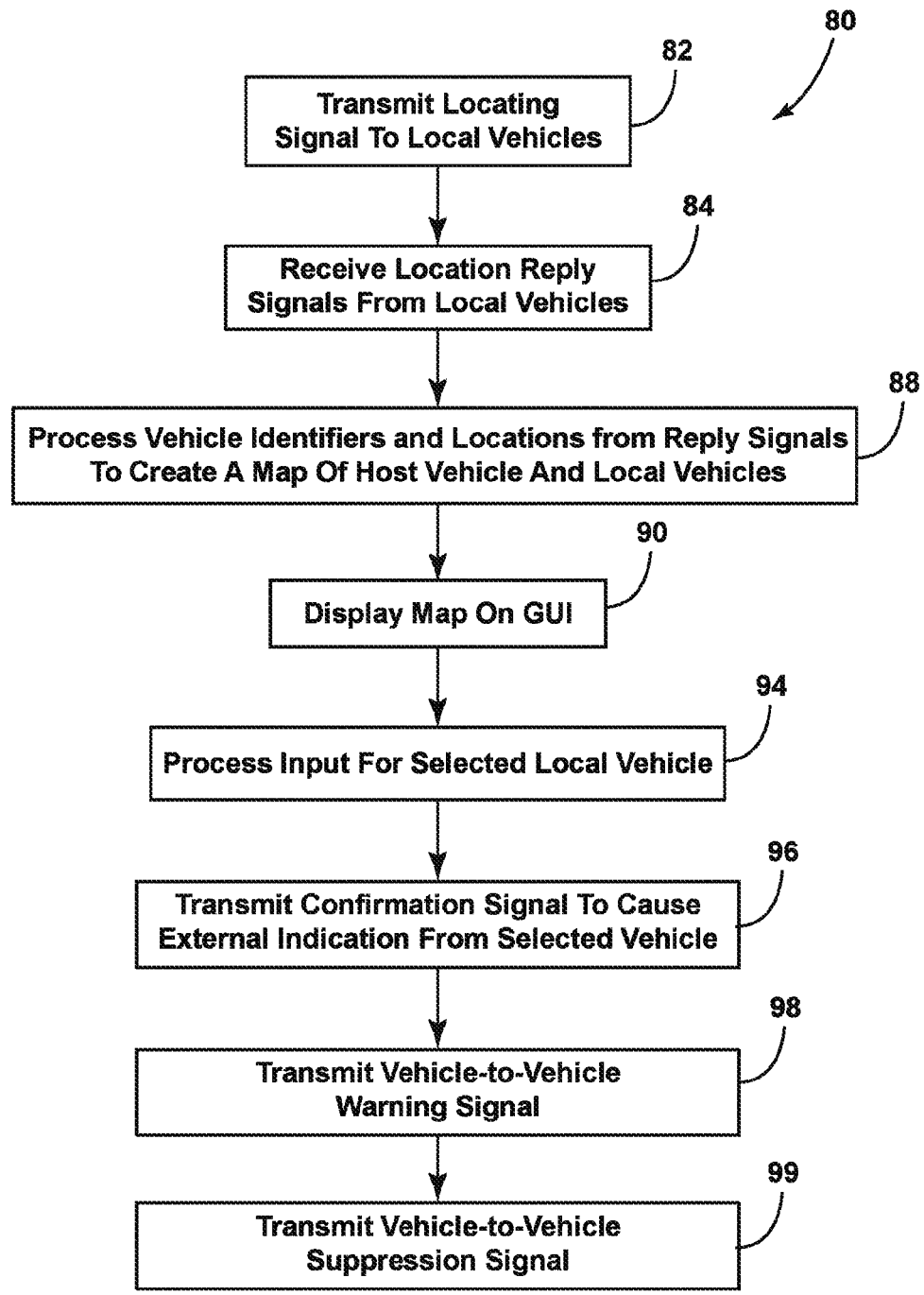
FIG. 4 is a flow chart of a method of selecting and identifying the local vehicle to be controlled.

FIG. 4 is a flow chart 80 illustrating one method for selecting and identifying a local vehicle 16 as the selected vehicle 20. In the method, the host vehicle selection and suppression system 22 of FIG. 2 selects a local vehicle and confirms the intended local vehicle was selected. At a first step 82, in response to an input from the graphical user interface 36, the processor 26 of the host vehicle suppression control unit 24 outputs a vehicle-to-vehicle locating signal that is transmitted to local vehicles 16 by the host vehicle transceiver 34. The vehicle-to-vehicle locating signal is a request from the host vehicle 10 for obtaining locations from each of the local vehicles 16.

As shown in FIG. 3, the local vehicles 16 each have a transceiver 64 that receives the vehicle-to-vehicle locating signal sent from the host vehicle transceiver 34. The transceivers 64 of each of the local vehicles 16 provide the locating signals to the corresponding vehicle suppression controller 54 via the corresponding CAN bus 60. In response to the locating signal, the processor 56 of the vehicle suppression controller 54 obtains a location positioning signal, such as a GPS signal from the global positioning system 62 and a vehicle identifier stored in memory 58 or elsewhere. Thereafter, the processor 56 provides the location positioning signals and the vehicle identifier in a vehicle-to-vehicle location reply signal that is transmitted by the transceiver 64 of a replying local vehicle 16. The vehicle-to-vehicle location reply signal is received by the host vehicle transceiver 34 of the host vehicle selection and suppression system 22 and provided to the host vehicle suppression control unit 24. Thus, each of the local vehicles 16 that is capable of transmitting a vehicle identifier and a GPS location does so by transmitting vehicle-to-vehicle location reply signals.

At step 84, the host vehicle suppression control unit 24 receives the vehicle-to-vehicle location reply signals from the local vehicles 16 and the processor 26 advances the program to step 88. At step 88, the processor 26 processes the GPS position and the vehicle identifier for each of the local vehicles 16. The processed information essentially results in a map showing the locations and directions of the local vehicles 16 in the local area 12 near the host vehicle 10 as shown in FIG. 1. After step 88, the processor 26 advances the program to step 90.

At step 90, in one embodiment, the location and direction of movement of the local vehicles 16 are displayed on the graphical user interface 36 that includes a touch screen. An example of a map is displaying the image of FIG. 1 by superimposing the image on the graphical user interface 36. The processor 26 advances to step 94.

At step 94, the processor 26 receives a selection input, such as a touch to a touch screen of the graphical user interface 36 that selects a local vehicle 16 as the selected vehicle 20 to be suppressed as shown in FIG. 1. The selected vehicle 20 must be informed or notified. Thus, the processor advances to step 96.

At step 96, the processor 26 of the host vehicle suppression control unit 24 transmits a vehicle-to-vehicle confirmation signal through the host vehicle transceiver 34 that is addressed by the vehicle identifier corresponding to the selected vehicle 20. In response to the vehicle-to-vehicle confirmation signal, the selected vehicle suppression system 50 provides an external indication that the selected vehicle 20 is the intended local vehicle. Thus, the selected vehicle 20 is confirmed to the user or operator in the host vehicle 10 before suppressing of the selected vehicle 20 occurs.

More specifically, when the vehicle suppression controller 54 receives the confirmation signal or selection signal from the host vehicle selection and suppression system 22, the vehicle suppression controller 54 provides an output via the CAN bus 60 to operate at least one from the group consisting of actuating the vehicle horn unit 68 and illuminating external lamps 70 of the selected vehicle 20. The actuation of the vehicle horn unit 68 and the external lamps 70 of the selected vehicle 20 enable an operator in the host vehicle 10 to observe and confirm that the selected vehicle 20 is the intended local vehicle. In one embodiment, the external lamps 70 include the four way flashers or emergency lights of the selected vehicle 20 that are illuminated for identification of the selected vehicle 20. In another embodiment, the headlights and/or the brake lights of the selected vehicle 20 are illuminated in a flashing manner for confirming the identity of the selected vehicle. In one embodiment, the vehicle horn unit 68 of the selected vehicle 20 is pulsed to provide a confirmation signal for identification. The vehicle horn unit 68 also provides an operator of the selected vehicle 20 with the knowledge that the selected vehicle is about to be controlled remotely by a host vehicle 10. Along with the external lamps 70 of the selected vehicle 20, internal lamps also are flashed in some embodiments.

For the computer program or routine shown in FIG. 4, the host vehicle selection and suppression system 22 awaits instructions or inputs to suppress or otherwise control the selected vehicle 20. In response to an input from a user in the host vehicle 10, the host vehicle transceiver 34 transmits a vehicle-to-vehicle warning signal at step 98 to the selected vehicle 20. Thereafter, when the selected vehicle 20 does not stop, a user in the host vehicle 10 may transmit a vehicle-to-vehicle suppression signal at step 99 in FIG. 4.

Figure 5:
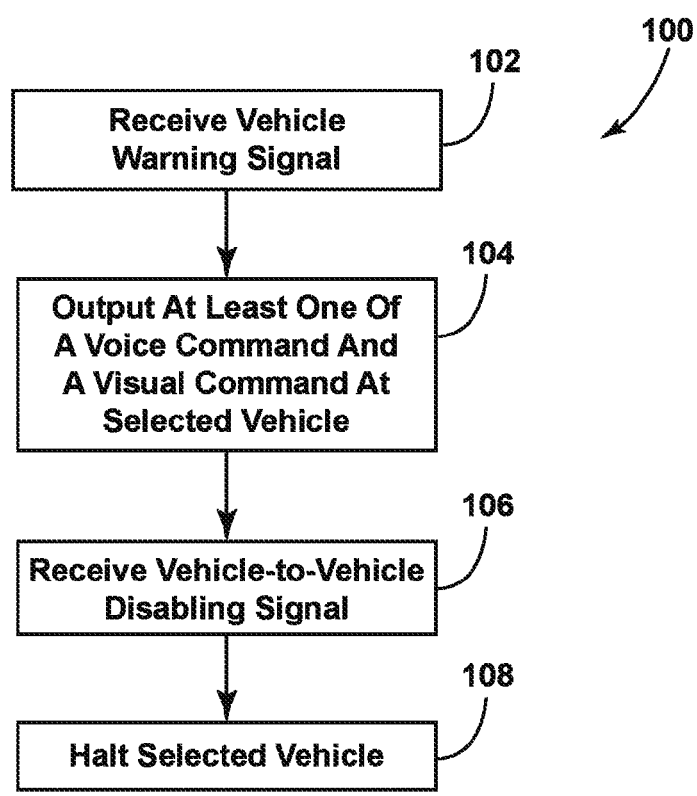
FIG. 5 is a flow chart of a method of a selected vehicle providing a warning.

FIG. 5 shows a flow chart 100 illustrating one method performed by the selected vehicle suppression system 50 shown in FIG. 3 in response to signals or commands from the host vehicle selection and suppression system 22 shown in FIG. 2. After the method of identifying the selected vehicle 20, the selected vehicle is suppressed in the following ways.

At a first step 102, the selected vehicle suppression system 50 receives a vehicle-to-vehicle warning signal that is transmitted to the selected vehicle 20 by the host vehicle transceiver 34 of the host vehicle selection and suppression system 22. The processor 56 of the vehicle suppression controller 54 advances to step 104.

At step 104 the selected vehicle suppression system 50 outputs at least one from the group consisting of outputting a voice command from a loudspeaker unit 72 and outputting a visual command provided on the display 74 of the selected vehicle 20 in response to the vehicle-to-vehicle warning signal. The voice and visual commands provide a warning to an operator of the selected vehicle 20 that the vehicle is remotely controlled and will be slowed and eventually halted if the operator does not comply and halt the selected vehicle 20 on their own volition. If not halted by the operator, the selected vehicle 20 receives a vehicle-to-vehicle disabling signal from the host vehicle 10 at step 106. In response to the disabling signal, the selected vehicle 20 halts at step 108.

Further, in another embodiment wherein the selected vehicle 20 has a hands free cellular phone system, voice-to-voice communication is established with the host vehicle 10. In this embodiment, the vehicle-to-vehicle warning signal includes voice data from the microphone unit 40 that is transmitted from the host vehicle suppression control unit 24 through the transceiver 34 to the transceiver 64 of the selected vehicle 20. The vehicle suppression controller 54 determines the presence of the voice data and the voice data is provided to the loudspeaker unit 72 and output to persons in the selected vehicle 20. Likewise the microphone unit 73 shown in FIG. 3 receives voice signals from an operator or passenger in the selected vehicle 20 and via the selected vehicle suppression system 50 transmits the voice signals to the host vehicle 10. In this embodiment, a police officer or other person in the host vehicle 10 intending to halt the selected vehicle 20 is able to communicate directly with the operator of the selected vehicle. Thus, the possibility of a simple resolution of an evading driving situation is improved.

Besides selectively providing the vehicle-to-vehicle warning signal, the processor 26 provided in the host vehicle selection and suppression system 22 is also configured to provide a vehicle-to-vehicle disabling signal and a vehicle-to-vehicle halting signal. Additional suppression signals are contemplated. An operator of the host vehicle 10 may select any of the warning, disabling and halting signals at their discretion. In one embodiment, the various signals are chosen or selected from a list provided on the graphical user interface 36. Another embodiment includes voice recognition to choose or select the output of the host vehicle selection and suppression system 22.

Returning to the selected vehicle suppression system 50, in response to receiving a vehicle-to-vehicle disabling signal from the host vehicle 20, the system responds as follows. The processor 56 of the vehicle suppression controller 54 executes a program to provide an output to the vehicle speed controller 76 of the selected vehicle 20. In one embodiment, the vehicle speed controller 76 includes an electronic stability program of an electronic stability control unit of the selected vehicle 20 to limit speed of the selected vehicle. The selected vehicle 20 is permitted to maintain speed, but in every instance that the selected vehicle slows, the slower speed becomes the maximum speed for the selected vehicle.

In another embodiment, the vehicle speed controller 76 includes the automatic cruise control (ACC) and utilizes the automatic cruise control to limit the vehicle speed. Again, in instances when the selected vehicle 20 slows, the lower speed becomes the upper speed limit for the selected vehicle 20. Thus, an operator of the selected vehicle 20 is unable to evade or escape from the host vehicle 10.

In response to receiving a vehicle-to-vehicle halting signal from the host vehicle 10, the selected vehicle suppression system 50 of the selected vehicle 20 responds, in one example, as follows. The processor 56 of the vehicle suppression controller 54 executes a program to provide an output to the vehicle speed controller 76 of the selected vehicle 20. In one embodiment, the vehicle speed controller 76 includes and executes the electronic stability program to reduce vehicle speed of the selected vehicle 20. In some embodiments deceleration of the selected vehicle 20 is a low or slow deceleration value. In one embodiment, fuel flow to an engine of the selected vehicle is cut or discontinued slowly to halt the vehicle. In one embodiment, the vehicle transmission is placed in a neutral condition to prevent the engine from powering the selected vehicle 20. Further, in another embodiment, the processor 56 of the vehicle suppression controller 54 provides a brake output signal to the brake controller 78 to selectively actuate the brakes of the selected vehicle 20 and ultimately halt movement of the selected vehicle 20. In one embodiment, actuating of the brakes is performed by the automatic cruise control.

The vehicle-to-vehicle warning signal, the vehicle-to-vehicle disabling signal, and the vehicle-to-vehicle halting signal all represent vehicle-to-vehicle suppression signals. Other suppression signals may provide combinations of the suppression outcomes discussed above.

The processors 26, 56, discussed above are microprocessors in one embodiment, but are an application specific integrated circuit (ASIC) in another embodiment. The memory 28, 58 discussed above may include RAM, ROM, and other computer memory devices.

While not discussed herein, encryption and other information protection techniques are contemplated herein to ensure that only authorized vehicles are capable of selectively suppressing local vehicles.

Thus, the invention provides, among other things, a method for enabling an authorized host vehicle to select and control the driving of a local vehicle. Further, the local vehicle is selected and positively identified before becoming disabled. Various features and advantages of the invention are set forth in the following claims.

What is claimed is:

1. A method for selecting and suppressing a local vehicle including vehicle-to-vehicle communication comprising:
   transmitting a vehicle-to-vehicle locating signal from a host vehicle to local vehicles to obtain a location and a direction of movement for local vehicles within a local area;
   receiving, at the host vehicle, vehicle-to-vehicle reply signals from replying local vehicles within a local area, the vehicle-to-vehicle reply signals each including a vehicle identifier for identifying a local vehicle and a location positioning signal for the location and the direction of movement for a local vehicle;
   processing the vehicle identifiers and the location positioning signals of the vehicle-to-vehicle location reply signals from replying vehicles;
   displaying replying local vehicles on a visual display on the host vehicle according to the location and the direction of movement;
   receiving an input selecting a replying local vehicle as a selected vehicle to be suppressed; and
   suppressing the selected vehicle by providing a vehicle-to-vehicle suppression signal from the host vehicle to the selected vehicle.

2. The method according to claim 1, wherein the displaying of replying local vehicles on a visual display provided in the host vehicle according to the location and the direction of movement includes the displaying of a map including replying local vehicles on the visual display.

3. The method according to claim 2, wherein the visual display includes a graphical user interface provided in the host vehicle and the selection of the selected vehicle occurs by touch of the map displayed on the graphical user interface.

4. The method according to claim 2, further comprising
   confirming that the selected vehicle is an intended local vehicle by transmitting a vehicle-to-vehicle confirmation signal from the host vehicle to the selected vehicle, and
   the selected vehicle receiving the vehicle-to-vehicle confirmation signal and operating at least one from a group consisting of illuminating external lamps and actuating a vehicle horn unit of the selected vehicle for confirming the identity of the selected vehicle.

5. The method according to claim 4, wherein the suppressing of the selected vehicle includes
   transmitting a vehicle-to-vehicle warning signal from the host vehicle to the selected vehicle, and outputting at least one from a group consisting of a voice command from a loudspeaker unit and a visual command provided on a display of the selected vehicle in response to the vehicle-to-vehicle warning signal.

6. The method according to claim 5, wherein the voice command is a voice signal provided with the vehicle-to-vehicle warning signal transmitted by the host vehicle for output from the loudspeaker unit.

7. The method according to claim 4, wherein the suppression of the selected vehicle includes
    operating a vehicle speed controller of the selected vehicle to limit speed of the selected vehicle.

8. The method according to claim 4, wherein the suppressing of the selected vehicle includes
    operating a vehicle speed controller to reduce vehicle speed of the selected vehicle and actuating vehicle brakes to halt movement of the selected vehicle.

9. A host vehicle selection and suppression system for a host vehicle to suppress a selected vehicle, the host vehicle selection and suppression system comprising:
    a host vehicle position locating system disposed in the host vehicle for providing a location of the host vehicle;
    a host vehicle transceiver for providing vehicle-to-vehicle communication between the host vehicle and local vehicles;
    a user interface disposed in the host vehicle for providing inputs to the host vehicle selection and suppression system; and
    a host vehicle suppression control unit disposed in the host vehicle, the host vehicle suppression control unit including a processor, the processor configured to
        provide a vehicle-to-vehicle locating signal from the host vehicle that is transmitted to local vehicles to obtain a location and a direction of movement for local vehicles within a local area,
        process vehicle identifiers and location positioning signals received with vehicle-to-vehicle location reply signals from replying local vehicles,
        display replying local vehicles on a visual display on the host vehicle according to the location and the direction of movement,
        receive an input selecting a local vehicle as the selected vehicle to be suppressed in response to a selection input to the user interface, and
        suppress operation of the selected vehicle by providing a vehicle-to-vehicle suppression signal from the host vehicle suppression control unit that is transmitted to the selected vehicle.

10. The host vehicle selection and suppression system according to claim 9, wherein the processor of the host vehicle suppression control unit is configured to confirm the selected vehicle by providing a vehicle-to-vehicle confirmation signal from the host vehicle that is transmitted to the selected vehicle, and the selected vehicle includes a selected vehicle suppression system having a vehicle suppression controller for confirming the selected vehicle is an intended local vehicle by providing an external indication from the selected vehicle.

11. The host vehicle selection and suppression system according to claim 10, wherein the external indication from the selected vehicle includes at least one from a group consisting of illuminating external lamps of the selected vehicle and actuating a vehicle horn unit of the selected vehicle.

12. The host vehicle selection and suppression system according to claim 9, wherein the processor of the host vehicle suppression control unit is configured to
    display replying local vehicles with a map on a visual display in the host vehicle according to the location and the direction of movement of the replying local vehicles, and
    receive an input selecting a local vehicle as the selected vehicle.

13. The host vehicle selection and suppression system according to claim 12, wherein the visual display includes a graphical user interface provided in the host vehicle and the selection of the selected vehicle occurs by a touch of the graphical user interface.

14. A method for identifying and suppressing a selected vehicle including vehicle-to-vehicle communication comprising:
    providing a vehicle-to-vehicle locating signal from a host vehicle to local vehicles to request location and direction of movement for local vehicles within a local area;
    receiving at the host vehicle, vehicle-to-vehicle location reply signals from local vehicles within a local area, the vehicle-to-vehicle location reply signals each including a vehicle identifier for identifying a local vehicle and a location positioning signal for the location and the direction of movement of a local vehicle;
    processing the vehicle identifiers and the location positioning signals of the vehicle-to-vehicle location reply signals from replying local vehicles;
    displaying replying local vehicles on a visual display according to the location and the direction of movement;
    selecting a local vehicle as the selected vehicle to be suppressed;
    confirming that the selected vehicle is an intended local vehicle; and
    suppressing the selected vehicle using vehicle-to-vehicle communication from the host vehicle to the selected vehicle.

15. The method according to claim 14, wherein confirming that the selected vehicle is an intended local vehicle includes
    providing a vehicle-to-vehicle confirmation signal from the host vehicle to the selected vehicle, and
    a selected vehicle suppression system of the selected vehicle receiving the confirmation signal and providing an external indication that the selected vehicle was selected.

16. The method according to claim 15, wherein the external indication includes the selected vehicle operating at least one from a group consisting of illuminating external lamps and actuating a vehicle horn unit of the selected vehicle for confirming the identity of the selected vehicle.

17. The method according to claim 14, wherein the suppressing of the selected vehicle includes
    providing a vehicle-to-vehicle warning signal from the host vehicle to the selected vehicle, and
    outputting a voice command from a loudspeaker unit at the selected vehicle.

18. The method according to claim 14, wherein the suppression of the selected vehicle includes
    providing a vehicle-to-vehicle halting signal from the host vehicle to the selected vehicle,
    operating a vehicle speed controller of the selected vehicle in response to the vehicle-to-vehicle halting signal to reduce vehicle speed of the selected vehicle, and
    actuating vehicle brakes to reduce vehicle speed and halt movement of the selected vehicle.

19. The method according to claim 14, wherein the displaying of replying local vehicles on the visual display is provided as a map according to the location and the direction of movement of the local vehicles, wherein the selecting of a local vehicle corresponds to touch of the location of the selected vehicle displayed on the map.

* * * * *